(12) United States Patent
Manohar et al.

(10) Patent No.: US 8,078,899 B2
(45) Date of Patent: *Dec. 13, 2011

(54) ASYNCHRONOUS CONVERSION CIRCUITRY APPARATUS, SYSTEMS, AND METHODS

(75) Inventors: Rajit Manohar, Ithaca, NY (US);
Clinton W. Kelly, San Jose, CA (US);
Virantha Ekanayake, San Jose, CA (US); Christopher LaFrieda, Brooklyn, NY (US); Hong Tam, San Jose, CA (US); Ilya Ganusov, San Jose, CA (US);
Raymond Nijssen, San Jose, CA (US);
Marcel Van der Goot, Pasadena, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,843

(22) Filed: Feb. 8, 2011

(65) Prior Publication Data

US 2011/0130171 A1 Jun. 2, 2011

Related U.S. Application Data

(63) Continuation of application No. 12/559,069, filed on Sep. 14, 2009, now Pat. No. 7,900,078.

(51) Int. Cl.
*G06F 1/04* (2006.01)
*H03K 19/00* (2006.01)
*H04L 7/00* (2006.01)
(52) U.S. Cl. ........ 713/375; 713/400; 713/500; 713/600; 327/141; 375/354; 375/370; 365/233; 326/93; 326/39; 455/63.4; 455/115.1; 455/115.3

(58) Field of Classification Search .................... 326/93, 326/38–40; 327/141, 146; 375/220, 354–357, 375/362–367, 368, 370; 455/63.4, 115.1, 455/115.3
See application file for complete search history.

(56) References Cited

U.S. PATENT DOCUMENTS

| 4,756,010 A | * | 7/1988 | Nelson et al. | 375/354 |
| 5,245,605 A | * | 9/1993 | Ofek | 370/447 |

(Continued)

FOREIGN PATENT DOCUMENTS

WO WO-2008008629 A2 1/2008

(Continued)

OTHER PUBLICATIONS

"U.S. Appl. No. 12/304,694, 312 Amendment filed Sep. 30, 2010", 7 pgs.

(Continued)

*Primary Examiner* — Vibol Tan
(74) *Attorney, Agent, or Firm* — Schwegman, Lundberg & Woessner, P.A.

(57) ABSTRACT

Apparatus, systems, and methods operate to receive a sufficient number of asynchronous input tokens at the inputs of an asynchronous apparatus to conduct a specified processing operation, some of the tokens decoded to determine an operation type associated with the specified processing operation; to receive an indication that outputs of the asynchronous apparatus are ready to conduct the specified processing operation; to signal a synchronous circuit to process data included in the tokens according to the specified processing operation; and to convert synchronous outputs from the synchronous circuit into asynchronous output tokens to be provided to outputs of the asynchronous apparatus when the synchronous outputs result from the specified processing operation. Additional apparatus, systems, and methods are disclosed.

20 Claims, 9 Drawing Sheets

U.S. PATENT DOCUMENTS

| | | | |
|---|---|---|---|
| 5,367,209 | A | 11/1994 | Hauck et al. |
| 5,724,276 | A | 3/1998 | Rose et al. |
| 5,834,957 | A | 11/1998 | Staton |
| 5,926,036 | A | 7/1999 | Cliff et al. |
| 5,943,288 | A | 8/1999 | Jiang |
| 6,075,830 | A | 6/2000 | Piirainen |
| 6,111,814 | A * | 8/2000 | Schaefer ............... 365/233.5 |
| 6,292,496 | B1 * | 9/2001 | Rasanen ............... 370/503 |
| 6,359,468 | B1 | 3/2002 | Park et al. |
| 6,557,161 | B2 | 4/2003 | Jones |
| 6,611,469 | B2 | 8/2003 | Williams et al. |
| 6,762,630 | B2 * | 7/2004 | Fibranz et al. ............ 327/141 |
| 6,848,060 | B2 | 1/2005 | Cook et al. |
| 6,912,860 | B2 * | 7/2005 | Zima et al. ............... 62/149 |
| 6,934,816 | B2 | 8/2005 | Matthews et al. |
| 6,950,959 | B2 * | 9/2005 | Davies et al. ............ 713/500 |
| 6,961,741 | B2 | 11/2005 | Swami |
| 6,961,863 | B2 | 11/2005 | Davies et al. |
| 7,157,934 | B2 | 1/2007 | Teifel |
| 7,301,824 | B1 | 11/2007 | New |
| 7,395,450 | B2 | 7/2008 | Karaki |
| 7,454,589 | B2 | 11/2008 | Taniguchi et al. |
| 7,688,671 | B2 | 3/2010 | Hosoe et al. |
| 7,733,123 | B1 | 6/2010 | Young et al. |
| 7,739,628 | B2 | 6/2010 | Manohar et al. |
| 7,765,382 | B2 * | 7/2010 | Chester ............... 712/15 |
| 7,880,499 | B2 | 2/2011 | Rajit et al. |
| 7,900,078 | B1 | 3/2011 | Manohar et al. |
| 2002/0116426 | A1 | 8/2002 | Swami |
| 2005/0077918 | A1 | 4/2005 | Teifel et al. |
| 2010/0013517 | A1 | 1/2010 | Manohar et al. |
| 2010/0102848 | A1 | 4/2010 | Gershenfeld et al. |
| 2010/0185837 | A1 | 7/2010 | Dalrymple et al. |
| 2010/0303067 | A1 | 12/2010 | Manohar et al. |
| 2011/0062987 | A1 | 3/2011 | Manohar et al. |
| 2011/0169524 | A1 | 7/2011 | Manohar |

FOREIGN PATENT DOCUMENTS

| | | |
|---|---|---|
| WO | WO-2008008629 A3 | 1/2008 |
| WO | WO-2008008629 A4 | 1/2008 |

OTHER PUBLICATIONS

"U.S. Appl. No. 12/304,694, Notice of Allowance mailed Sep. 20, 2010", 10 pgs.

"U.S. Appl. No. 12/304,694, Preliminary Amendment filed Dec. 12, 2008", 3 pgs.

"U.S. Appl. No. 12/304,694, Response filed Aug. 20, 2010 to Restriction Requirement mailed Aug. 9, 2010", 6 pgs.

"U.S. Appl. No. 12/304,694, Restriction Requirement mailed Aug. 9, 2010", 6 pgs.

"U.S. Appl. No. 12/559,069 Notice of Allowance mailed Oct. 20, 2010", 7 pgs.

"U.S. Appl. No. 12/559,069 Restriction Requirement mailed Oct. 1, 2010", 2 pgs.

"European Application Serial No. 07840303.7, Extended European Search Report mailed Aug. 16, 2010", 7 pgs.

"International Application Serial No. PCT/US2007/072300, International Search Report and Written Opinion mailed Sep. 24, 2008", p. 220.

"Korean Application Serial No. 10-2008-7031271, Office Action mailed Sep. 3, 2010", 6 Pgs.

"Korean Application Serial No. 10-2008-7031271, Response to Office Action mailed Nov. 3, 2010", 41 Pgs.

"U.S. Appl. No. 12/475,744 entitled "Asynchronous Pipelined Interconnect Architecture With Fan-out Support" filed on Jun. 1, 2009".

Ekanayake, V. N, et al., "Asynchronous DRAM Design and Synthesis", Ninth IEEE International Symposium on Asynchronous Circuits and Systems (ASYNC'03), (2003), 174-183.

"U.S. Appl. No. 13/007,933, Non Final Office Action mailed Jun. 20, 2011", 5 pgs.

"Korean Application Serial No. 10-2008-7031271, Final Office Action mailed Mar. 11, 2011", with English translation of Office Action Summary, 5 pgs.

\* cited by examiner

ASYNCHRONOUS CONVERSION CIRCUITRY APPARATUS, SYSTEMS, AND METHODS

This application is a continuation of U.S. patent application Ser. No. 12/559,069, filed on Sep. 14, 2009, now issued as U.S. Pat. No. 7,900,078, which is incorporated herein by reference in its entirety.

BACKGROUND

In many cases, asynchronous circuit designs offer advantages over synchronous designs, such as performance and power benefits. However, to implement a device based on asynchronous logic, additional time, experience, and dedicated asynchronous design tools are needed. For this and other reasons, existing Application Specific Integrated Circuit (ASIC) devices are often designed using synchronous circuits and techniques.

BRIEF DESCRIPTION OF THE DRAWINGS

Embodiments of the invention are illustrated by way of example and not limitation in the figures of the accompanying drawings in which.

DETAILED DESCRIPTION

Given the potential advantages of asynchronous circuits, it may be useful to employ them in a wide variety of applications. However, synchronous circuits for many applications have already been developed. Thus, the various embodiments described herein are directed toward solving the technical problem of using synchronous core circuitry in asynchronous application environments. This can be accomplished, for example, by incorporating synchronous circuitry (e.g., in the form of one or more application-specific integrated circuit (ASIC) blocks) within an asynchronous system. Various embodiments therefore include apparatus, systems, and methods to interface synchronous circuitry so that the result operates as an asynchronous block.

For example, synchronous memory array circuitry is widely available and has been extensively developed. Asynchronous field-programmable gate arrays (FPGAs) are also available. Many designs can benefit from a combination of the two, where the synchronous core memory circuitry (e.g., a random access memory, or RAM) appears to the inputs/outputs of the FPGA (and to the software tools used to map designs to the FPGA) as a quasi-delay insensitive black box. This means that timing assumptions made during the design of the synchronous memory core circuitry are hidden from the FPGA inputs/outputs and the FPGA programming environment, and the correct behavior of the synchronous memory embedded in the FPGA should be completely independent of the asynchronous FPGA inputs and outputs.

Figure 1:
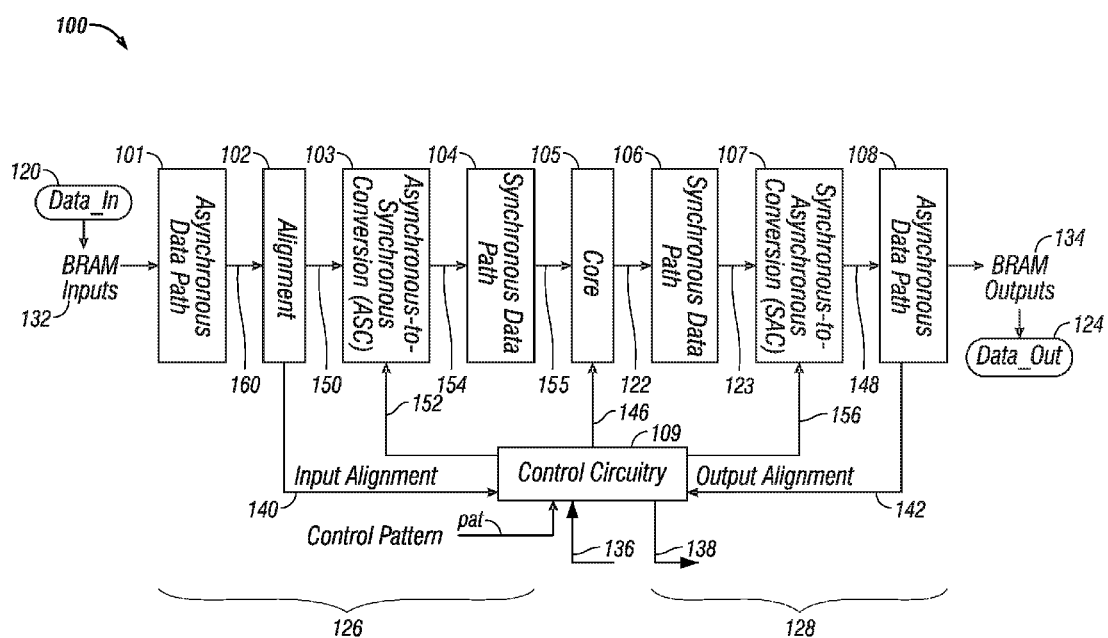
FIG. 1 is a block diagram of an apparatus according to various embodiments of the invention.

FIG. 1 is a block diagram of an apparatus 100 according to various embodiments of the invention, using a RAM core circuit 105 as the illustrative example. While a RAM is shown herein as a matter of convenience and for clarity, other synchronous core circuits, such as processors, registers, etc. can be used in lieu of the RAM. Thus, the use of a RAM for the core circuit 105 is done for reasons of simplicity, and not limitation.

Asynchronous data 120 enters the apparatus 100 as asynchronous data tokens and is converted into synchronous signals that are fed into a conventional synchronous RAM core circuit 105. The output data 122 of the core circuit 105 then go through some additional synchronous circuitry, becoming revised synchronous data 123, before being converted back into asynchronous data 124 tokens, which leave the apparatus 100. The apparatus 100 performs some amount of processing on the input data 120 and output data 124 to implement various specified operations. This processing can happen in the asynchronous or synchronous domain, along the input or output data paths 126, 128.

The external interface to the apparatus 100 can have multiple ports. In FIG. 1, an input port 132 is shown to receive the input data 120, and an output port 134 is shown to provide the output data 124. Other input and output ports 136, 138 may also exist, so that an apparatus has one or more input ports 132, 136 and one or more output ports 134, 138, for example.

Each port has a set of operations it can perform within the apparatus 100, possibly changing the state of the apparatus 100 in the process. In cases where there are more than one port, communication within the apparatus 100 may occur to preserve temporal relationships between the operations performed by different ports. When this occurs, the ports involved are said to be "related". In the case of a synchronous RAM used as the core circuit 105, the ports 132, 134 of the apparatus 100 operate in the following way.

Data 120 tokens for the various apparatus inputs (e.g., input data, storage address, byte enables, etc.) arrive at the apparatus 100 asynchronous input boundary port 132, using the asynchronous data path 101 without any guarantee as to their timing. These tokens go through some alignment circuitry 102, which operates to verify that all of the inputs needed for a given operation have arrived. After proceeding through the alignment circuitry 102 and being converted to synchronous data using asynchronous to synchronous conversion circuitry 103, the input data can enter the synchronous domain, using the synchronous data path 104. At this point, the RAM input data can be used to drive the synchronous core circuit 105, in this case, comprising a RAM.

Control circuitry 109 can operate to receive a signal 140 that the alignment circuitry 102 has verified that a sufficient number of the input tokens have arrived. In some cases, this means that all available input tokens have arrived at the alignment circuitry 102. The control circuit 109 can also operate to receive one or more signals 142 that indicate that the apparatus outputs at port 134 are ready for another operation. In addition, the control circuitry 109 can operate to receive feedback from one or more other ports (e.g., port 138 for a multi-port apparatus 100, such as a multi-port asynchronous RAM) indicating port status, for operating modes where synchronized operations between ports are useful.

The control circuitry 109 can operate to produce signals (e.g., core clock pulses 146) that trigger the core circuit 105, resulting in the production of synchronous output data 122 that are transmitted along the synchronous data path 106. This output data 122, after traveling through the synchronous data path 106 and being converted to revised synchronous data 123, is converted to asynchronous tokens 148 by synchronous-to-asynchronous conversion circuitry 107, before arriving at the asynchronous data path 108, on the way to the output port 134. The control circuitry 109 may also produce signals that are transmitted to other ports (e.g., port 136) that communicate the status of the operation conducted at the port 134, permitting the implementation of synchronized port operations.

When the output data 122 of the core circuit 105 (and perhaps other synchronous circuitry in the apparatus 100) become revised synchronous data 123, and are converted back into asynchronous data tokens 148 by the synchronous-to-asynchronous conversion circuitry 107, the circuitry 108 may operate to signal the control circuitry 109, using a feedback signal 142, to indicate that the output tokens 148 have been generated, and that the apparatus 100 is ready to accept the next operation.

Figure 2:
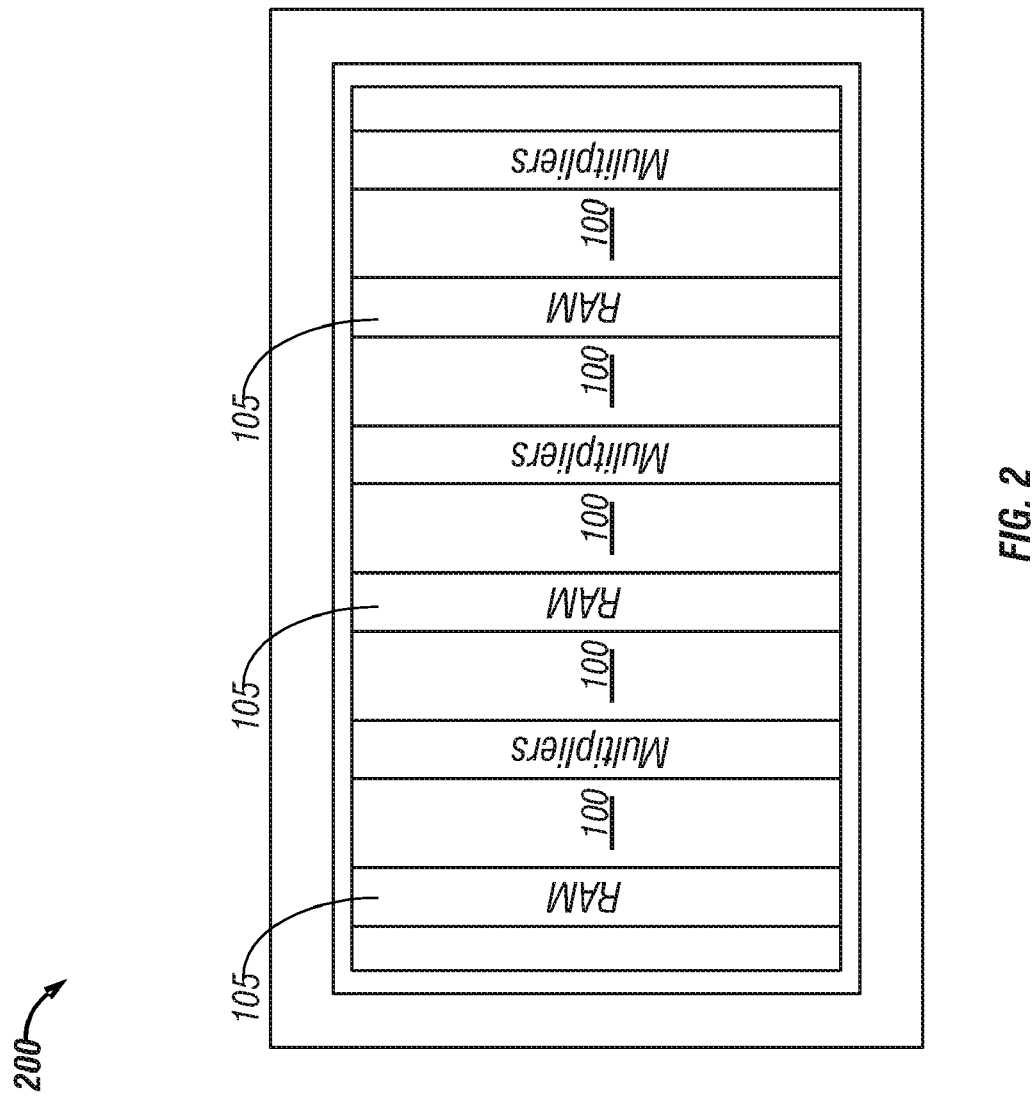
FIG. 2 illustrates an apparatus that includes multiple memory arrays as core circuits according to various embodiments of the invention.

FIG. 2 illustrates an apparatus 200 that includes multiple memory arrays as core circuits 105 according to various embodiments of the invention. The apparatus 200 may comprise an FPGA, for example, that includes multiple core circuits 105. In the example of FIG. 2, multiple synchronous memory arrays operate as a multi-port asynchronous RAM comprising a number of core circuits 105, operated by a corresponding number of apparatus 100 (see FIG. 1).

Thus, the apparatus 200 may comprise a programmable dual-port asynchronous static RAM (SRAM) block memory (BRAM) in a fast asynchronous FPGA. The BRAM can be operated as an 18 k RAM with a variety of combinations of widths and depths (e.g., 512×36-bit, 1 k×18-bit, 2 k×9-bit, 4 k×4-bit, 8 k×2-bit, and 16 k×1-bit), supporting different output modes (e.g., write-first or no-change) and synchronization between the two ports. A port can either be a true read/write port, with the ability to both write into and read out of the port, or only a write port, or only a read port. Because the BRAM is a component in an FPGA, it has various parameters that can be statically or dynamically configured for different designs. These parameters may include the width and depth of the BRAM, how it updates its outputs while it issues write operations, and how the ports interact.

The BRAM may thus be configured in a number of ways. Therefore, the following explanation of inputs, outputs, and operations is by way of explanation and not limitation.

Referring now to FIGS. 1 and 2, consider the BRAM implemented as a dual-port 18 k BRAM with the following inputs per port:
  36 data bits (din), some or all of which are used depending on the BRAM width (which varies from 36-bits to 1-bit)
  14 address bits (addr), some or all of which are used depending on the BRAM depth (which varies from 512 to 16 k entries)
  4 byte enables (be), which can be used to control writing the BRAM with a granularity of 9-bit bytes when the BRAM is configured to have a 36-bit or 18-bit width
  a write enable (we)
  a port enable (pe)
  a reset (ssrn)
  a control pattern signal (pat), which can be used by the control circuitry 109 to order (e.g., serialize) accesses to the core circuit 105 by the two ports. The use of this signal will be discussed in more detail below.

The BRAM may also be configured to comprise the following outputs per port:
  36 data bits (dout), some or all of which are driven depending on the BRAM width.

Consider also an SRAM core circuit 105 implemented as a 512×36 SRAM array with numerous inputs and outputs for each port. The relevant inputs and outputs may be listed as:
  36 data inputs (di)
  36 data outputs (do)
  9 address bits (a)
  36 bit-wise write enables (bwe)
  1 clock (clk)

Given the example configuration, the BRAM can be configured to implement the following combinations of depth and width: 512×36, 1 k×18, 2 k×9, 4 k×4, 8 k×2, and 16 k×1. When both ports of the BRAM are being used, the two ports can use different depth/width combinations. Additionally, the BRAM can implement different policies for driving the dout bits while performing a write. In write-first mode, the dout bits can be updated with the values being written to the BRAM on the same cycle (i.e., the values on din). In no-change mode, the value provided by dout does not change when the BRAM is being written. It should be noted that these techniques may be used to vary the width and depth of access to data within the core circuit 105 (when implemented as a memory array) and can be applied to BRAMs and SRAM arrays with different types and numbers of inputs and outputs.

Additional circuitry can be used in the apparatus 100 and 200 to provide such functionality. This circuitry, which will be described in detail below, operates to: route and modify the inputs of the BRAM and the outputs of the core circuit 105 SRAM array such that the BRAM implements the functionality (depth, width, output-during-write policy, etc.) for which it has been programmed; and present an asynchronous interface to the environment in which the apparatus 100, 200 is implemented.

Figure 3:
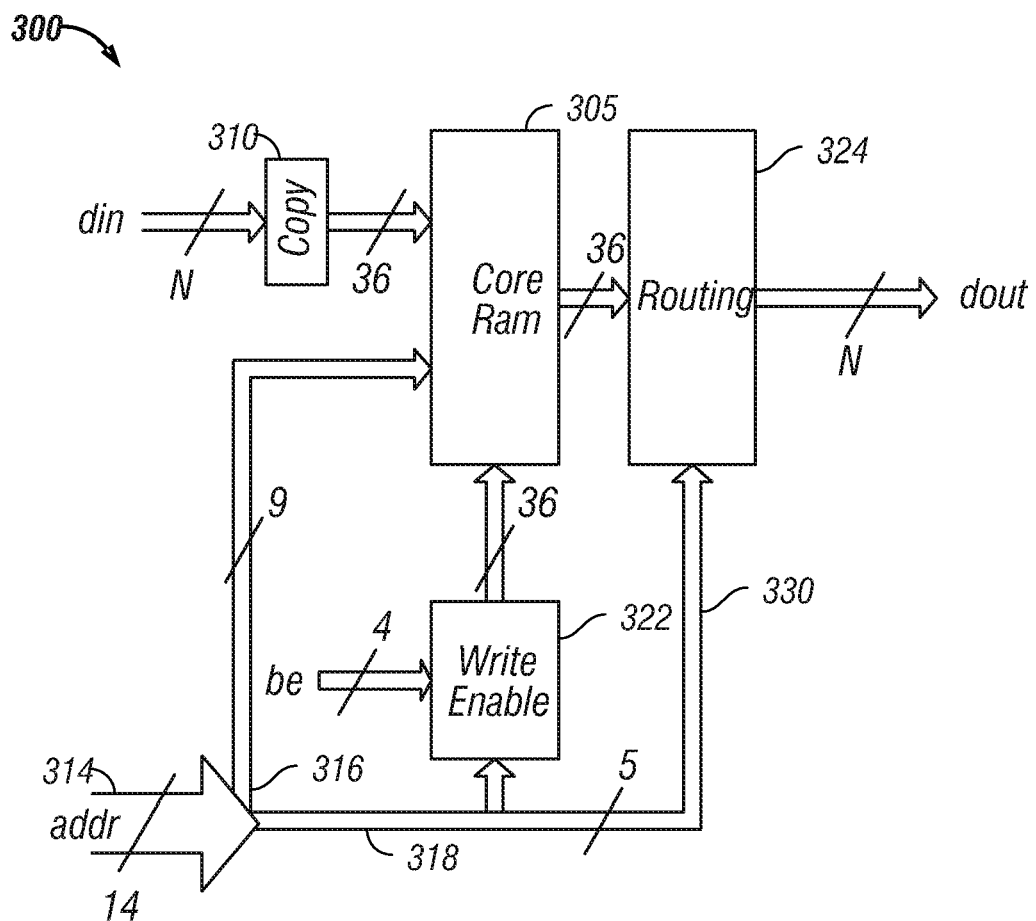
FIG. 3 is a block diagram of width/depth reconfiguration circuitry for an asynchronous memory apparatus according to various embodiments of the invention.

FIG. 3 is a block diagram of width/depth reconfiguration circuitry 300 for an asynchronous memory apparatus according to various embodiments of the invention. To implement programmable width and depth, supporting a variety of logical configurations, the reader is invited to consider the use of an SRAM core circuit 305. In this case, the SRAM core circuit 305 has a fixed set of nine address bits and, therefore, natively supports a 512×36 bit memory configuration. Nevertheless, other access modes can be emulated by utilizing the SRAM core circuit 305 36-bit-wise write enable we signal and adding logic to copy and route synchronous data to/from the SRAM core circuit 305.

To support various combinations of width and depth, three components can be used. First, the number of BRAM address bits visible to the user can be extended to fourteen bits (one extra bit for each additional mode, to support the enlarged address space). Logic can be introduced which automatically converts the additional address bits into a corresponding 36-bit write enable we signal, to support the reduced width of the data path entering the fixed 36-bit wide SRAM core circuit 305. Second, the lowest-order N bits of the BRAM data inputs (where N corresponds to the logical BRAM width) can be copied into appropriate higher-order bit positions. Finally, the appropriate group of N bits of the SRAM core circuit 305 output can be routed to the lower-order bit positions.

For example, using a BRAM operating in 1 k×18 mode, the input data path can be used to accomplish the following operations:

Copy the BRAM data inputs din[0 . . . 17] to the SRAM data inputs di[0 . . . 17] and di[18 . . . 35].

Copy the highest-order nine bits of the BRAM address inputs addr[5 . . . 13] to the SRAM address inputs a [0 . . . 8].

Use the next lower bit of the BRAM input address addr[4], the first two byte enable signals be[0 . . . 1], and the write-enable signal to drive the SRAM bit-wise write enable signals bwe[0 . . . 35].

For example, assume the following signal states exist: addr[4] is 1, be[0] is 1 and be[1] is 0, and we is 1. If this is the case, then the copy and routing logic should operate to send the data in din[0 . . . 17] to di[18 . . . 35], to enable bwe[18 . . . 35], and to disable all of the other bwe signals.

At the same time, the output data path should route the appropriate 18-bit group of the SRAM core circuit 305 36-bit output to the BRAM output bits dout[0 . . . 17]. For example, if the BRAM input address addr[4] is equal to 1, then the output data path should operate to route values in do[18 . . . 35] to dout[0 . . . 17]. If addr[4]=0, then the output data path should operate to route values in do[0 . . . 17] to the output of the BRAM.

In FIG. 3, the copy block 310 takes the N-bit wide BRAM data input (where N corresponds to the logical BRAM width) and copies it multiple times to create a 36-bit signal for the SRAM core circuit 305 data input. The exact number of copies depends on the selected logical BRAM width. For example, in 1 k×18 mode, the copy block 310 copies the lower eighteen bits [0 . . . 17] into the upper eighteen bits [18 . . . 35], while in 2 k×9 mode, the copy block 310 operates to copy the lower nine bits [0 . . . 8] to positions [9 . . . 17], [18 . . . 26], and [27 . . . 35].

Note that the 14-bit BRAM address bus 314 splits into two separate buses 316, 318. The upper nine bit bus 316 feed directly into the SRAM core circuit 305 address input, while the lower five bit bus 318 fans out into write enable and routing blocks 322, 324. The write enable block 322 generates write enable (we) signals for the core circuit 305 based on the values of the BRAM's byte enable (be) and the lower five bits of the address on the bus 318. The routing block 324 selects which group of the SRAM core circuit 305 36-bit output will be copied to the N-bit output of the BRAM. For example, in 1 k×18 mode, if the most significant byte of the five bits on the bus 318 of the address input is 1, the routing block 324 can route the upper eighteen bits of the SRAM core circuit 305 output to the output of the BRAM.

Referring now to FIGS. 1-3, it should be noted that the copy and write enable blocks 310 and 322 can form a part of the asynchronous data path 101 or the synchronous data path 106, while routing block 324 can form a part of the synchronous data path 106 or the asynchronous data path 108. Both placements can provide equivalent functionality and either one can be chosen. In a synchronous implementation of these blocks, the path 330 that includes address bits transmitted to the routing block 324 uses a stage comprising flops that are driven off the same clock as the SRAM core circuit 305 clock, to match the pipelining through the SRAM core circuit 305, and ensure that the address information arrives at the routing block 324 on the correct cycle.

Figure 4:
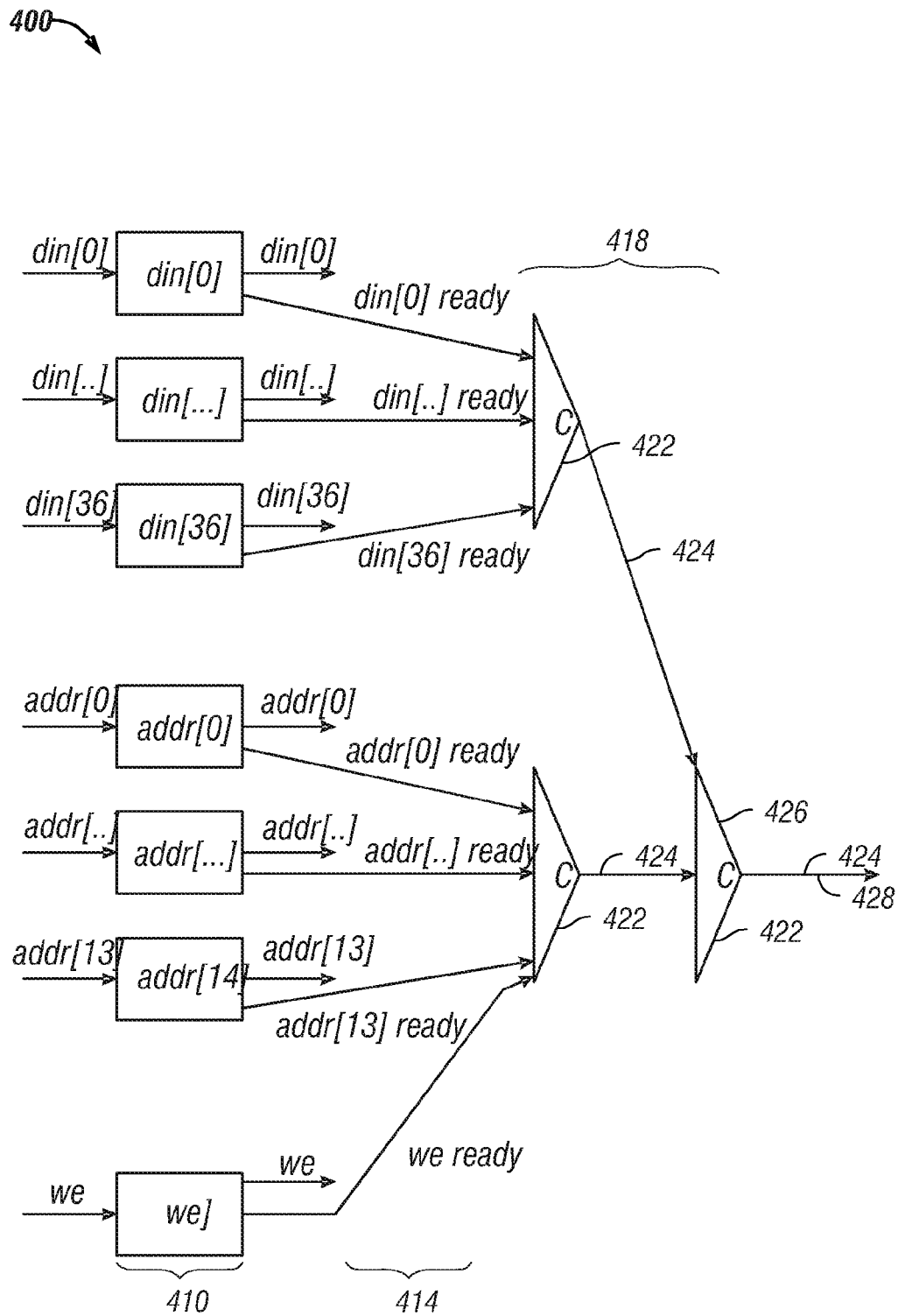
FIG. 4 is a block diagram of input alignment circuitry according to various embodiments of the invention.

FIG. 4 is a block diagram of input alignment circuitry 400 according to various embodiments of the invention. In this description of the alignment circuitry 400, the use of a synchronous memory array to provide an asynchronous BRAM as an example application will be continued.

Since the BRAM operates in an asynchronous environment and the core circuit 105 SRAM array operates synchronously, accesses to the BRAM involve converting signals from/to asynchronous and synchronous representations. For example, to write data into the BRAM, the BRAM's asynchronous data and address inputs are converted into synchronous signals that enter the synchronous core circuit 105. A synchronous clock signal to perform a memory write operation using the core circuit 105 is also generated.

Asynchronous to synchronous conversion can be performed in two parts. First, alignment circuitry 400 is used to ensure all needed data has arrived at the boundary between asynchronous and synchronous domains so that conversion can begin. To accomplish this objective, asynchronous buffers 410 with completion output signals 414 and a completion tree 418 can be used. Whenever each buffer 410 has data ready on its output, the buffer 410 can assert a completion signal 414 to indicate that the output is ready. Completion tree elements 422 operate to collect completion signals 414 from each buffer 410 and generate output tokens 424 whenever all of the inputs have arrived. The output tokens 424 of some completion elements 422 may feed into the inputs of other completion elements 422 at the second level of the completion tree 418. Second level output tokens 424 may feed into third level completion element inputs, and so on. In this example, the final completion element 426 asserts the final output completion signal 428 only after all of the buffers 410 indicated that their outputs are ready.

Other combinations may be implemented, so that less than all of the outputs are ready prior to the assertion of the final output completion signal 428. That is, the example shown in FIG. 4 demonstrates how completion signals for data, address, and write enable signals can be generated, but it can be extended by those of ordinary skill in the art to support any additional signals that are to be converted between asynchronous and synchronous domains.

Once a sufficient number of asynchronous inputs are ready (e.g., when all of the output signals 414 are asserted in FIG. 4), synchronous signal conversion may commence. FIG. 1 demonstrates a high-level view of the conversion process. The alignment circuitry 102 asserts its output data signals 150 and produces a completion signal 140 when all data on all channels are ready. Control circuitry 109 receives the completion signal 140 and generates a clock signal 152 for asynchronous-to-synchronous conversion circuitry 103. After the clock signal 152 is received, it can be used to sample the value of the input data signals 150, and to convert the data from an asynchronous to a synchronous representation. The resulting synchronous information 154 can be provided to the synchronous data path 104. After the data signals 150 are sampled and converted, the asynchronous-to-synchronous conversion circuitry 103 acknowledges receipt of the resulting data on its asynchronous input channels.

After the synchronous information 154 propagates though the synchronous data path 104, it can be processed by the synchronous core circuit 105 as synchronous path data 155. Control circuitry 109 coordinates the timing of clock signals for the asynchronous-to-synchronous conversion circuitry 103 and the core circuit 105 to ensure signals are valid before being sampled.

Clock signals 146, 152 can be transmitted to the core circuit 105 and the asynchronous-to-synchronous conversion circuitry 103 in at least two ways. In some cases, the control circuitry 109 first sends a clock signal 152 to the asynchronous-to-synchronous conversion circuitry 103, allowing synchronous information 154 to propagate through the synchronous data path 104, and then the control circuitry 109 can send a clock signal 146 to the core circuit 105. Alternatively, the control circuitry 109 can first send a clock signal to the core circuit 105, sample the value of synchronous path data 155 provided during the previous cycle, and then the control circuitry 109 can send a clock signal 152 to the asynchronous-to-synchronous conversion circuitry 103. In this second implementation, the core circuit 105 will receive new values only when the next signals 150 arrive at the asynchronous-synchronous conversion boundary. Both of these clock timing schemes will result in correct operation, and the choice depends on specific implementation trade-offs made by designers of the various embodiments.

To read data from the memory array core circuit 105, appropriate address bits should be set, and the write enable signal de-asserted. These signals are converted into synchronous signals by the asynchronous-to-synchronous conversion circuitry 103 and then sampled by the core circuit 105. After the core circuit 105 samples the address and de-asserted write enable information, the core circuit 105 can operate to provide the appropriate memory value on the output synchronous data path 106. The output data 122 can be routed within the synchronous data path 106 to support a specific memory configuration for data width and depth, as described previously.

Figure 5:
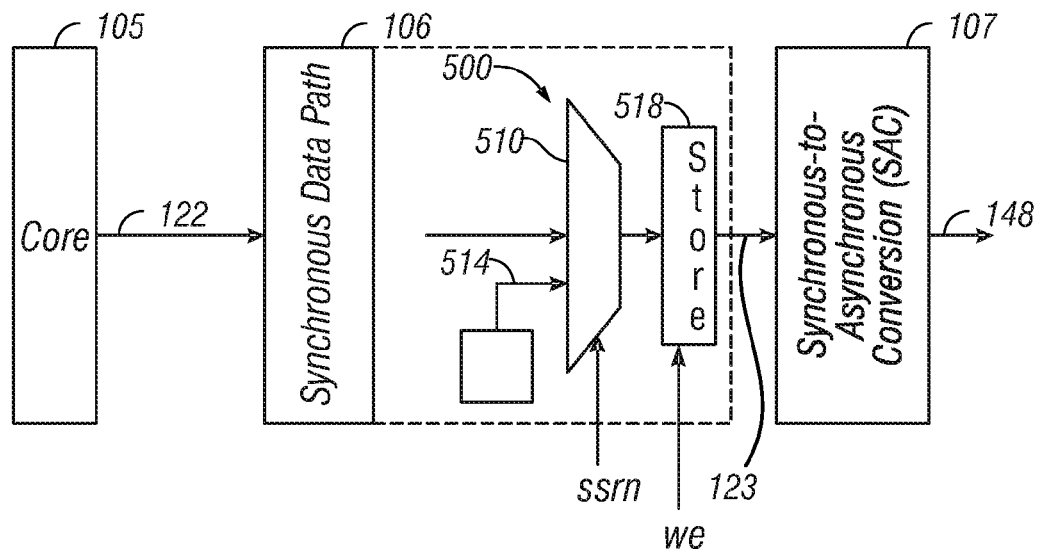
FIG. 5 is a block diagram of reset circuitry forming part of the synchronous data path according to various embodiments of the invention.

FIG. 5 is a block diagram of reset circuitry 500 forming part of the synchronous data path 106 according to various embodiments of the invention. If the reset signal ssrn is asserted during a write or read operation, the output data 148 should comprise output reset data values instead of memory content values. To support this functionality, each bit of the output data 122 goes through a multiplexer 510 controlled by the reset signal ssrn. The multiplexer 510 has two inputs: one input contains the value of the data 122 read from the memory core circuit 105, and another input contains reset data values 514. When the reset signal ssrn is asserted, the multiplexer 510 operates to propagate the reset data values 514 as revised synchronous data 123. If the reset signal ssrn is deasserted, the multiplexer 510 operates to propagate data 122 values read from the memory core circuit 105.

Figure 6:
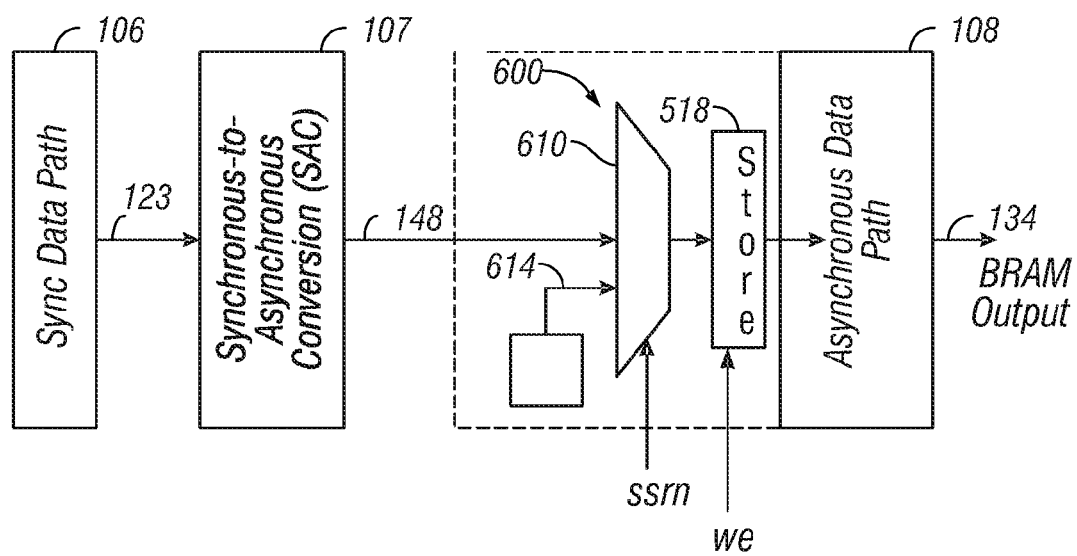
FIG. 6 is a block diagram of reset circuitry forming part of the asynchronous data path according to various embodiments of the invention.

FIG. 6 is a block diagram of reset circuitry 600 forming part of the asynchronous data path 108 according to various embodiments of the invention. In this case, a multiplexer 610 forms a part of the asynchronous data path 108, to provide the value of data 148 read out of the memory core circuit 105, or reset data values 614, based on the state of the reset signal ssrn. The placement of the reset circuitry 500, 600 in FIGS. 5 and 6, respectively, can provide equivalent functionality and either one can be chosen by the designer of various embodiments.

The output data at the port 134 can be procured during write-first and no-change read modes. In the write-first mode, the dout bits are updated with the values written to the BRAM on the same cycle (i.e., the values on din). In the no-change mode, the values on dout do not change when the BRAM is written. In some embodiments, the dout bits of the core circuit 105 are updated with the values written into it on the same cycle, so the write-first mode is provided by default. To implement the no-change mode, a register or other storage circuit 518 that stores the last data 122 values output by the core circuit 105 output during a read operation can be implemented. When the BRAM operates in the no-change mode and the port 134 is operating according to a write operation, the storage circuit 518 can be used to repeat the value of the data 122 last read from the BRAM. The storage circuit 518 can be controlled in some embodiments by the write enable we signal.

Figure 7:
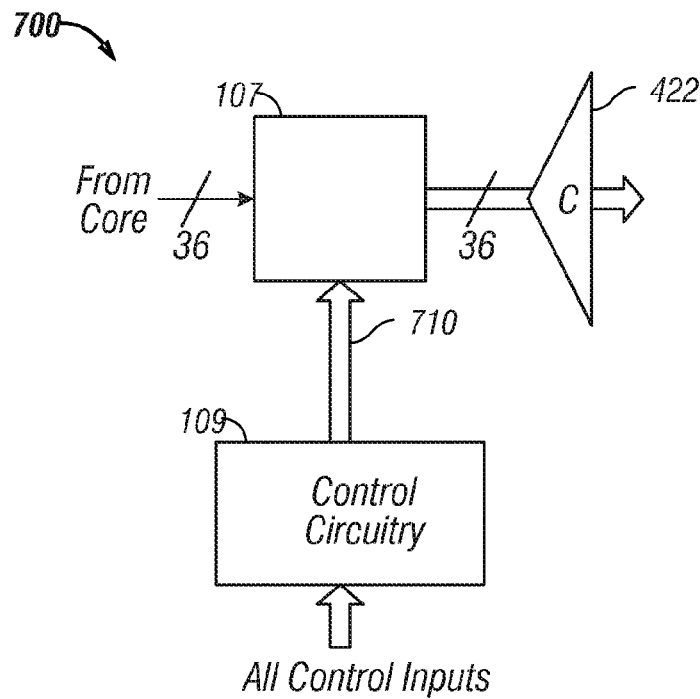
FIG. 7 is a block diagram of output feedback circuitry with alignment according to various embodiments of the invention.

FIG. 7 is a block diagram of output feedback circuitry 700 with alignment according to various embodiments of the invention. Referring now to FIGS. 1 and 7, it can be seen that the synchronous-to-asynchronous conversion circuitry 107 converts synchronous signals from the output synchronous data path 106 into asynchronous tokens 148. Whenever the synchronous-to-asynchronous conversion circuitry 107 receives a clock signal 156 from the control circuitry 109, it samples the information provided by the synchronous data path 106. If the asynchronous data path 108 is ready to accept tokens 148, the synchronous-to-asynchronous conversion circuitry 107 sends the asynchronous data tokens 148 on its output, completes an asynchronous handshake, and waits for the next clock signal 156 from the control circuitry 109. It should be noted that even if the asynchronous data path 108 is ready to accept more tokens 148 before the next clock signal 156 arrives, the synchronous-to-asynchronous conversion circuitry 107 will not produce more tokens. The conversion process repeats after the next clock signal 156 is received from control circuitry 109.

For example, before the control circuitry 109 sends a (read) clock signal 156 to the synchronous-to-asynchronous conversion circuitry 107, the asynchronous data path 108 should be ready to accept data tokens 148. If no feedback mechanism is provided, then the synchronous-to-asynchronous conversion circuitry 107 can erroneously drop output tokens 148 when the input data path 126 of the BRAM implementation produces tokens faster than the speed at which the output data path 128 can consume them. Therefore, feedback can be used to keep track of all output data channels by sending a token to the control circuitry 109 when all output channels of the synchronous-to-asynchronous conversion circuitry 107 are ready to accept new data from the synchronous data path 106.

There are at least two ways to implement this kind of feedback mechanism. First, the clock signal 156 from the control circuitry to the synchronous-to-asynchronous conversion circuitry 107 can be replaced with an asynchronous data channel 710, with output alignment added to the output of the synchronous-to-asynchronous conversion circuitry 107 (e.g., using one or more completion elements 422). The asynchronous data channel 710 provides flow control, and prevents the control circuitry 109 from issuing clock signals 156 until the completion element 422 indicates that all output channels of the synchronous-to-asynchronous conversion circuitry 107 are ready to accept data.

Output alignment can thus be implemented as a completion element 422 with 36 inputs in the case of the memory implementation described herein, to indicate asynchronous acknowledgement for all 36 output data channels. The output of the completion element 422 can fan out (as an output acknowledge signal) to all 36 outputs of the synchronous-to-asynchronous conversion circuitry 107. When all output channels are ready to receive data, the completion element 422 can assert a ready signal, causing the synchronous-to-asynchronous conversion circuitry 107 to send a feedback signal to the control circuitry 109. The control circuitry 109 receives the feedback signal, waits for all other control inputs of the next cycle to arrive, and then generates a new read token signal for the synchronous-to-asynchronous conversion circuitry 107.

Figure 8:
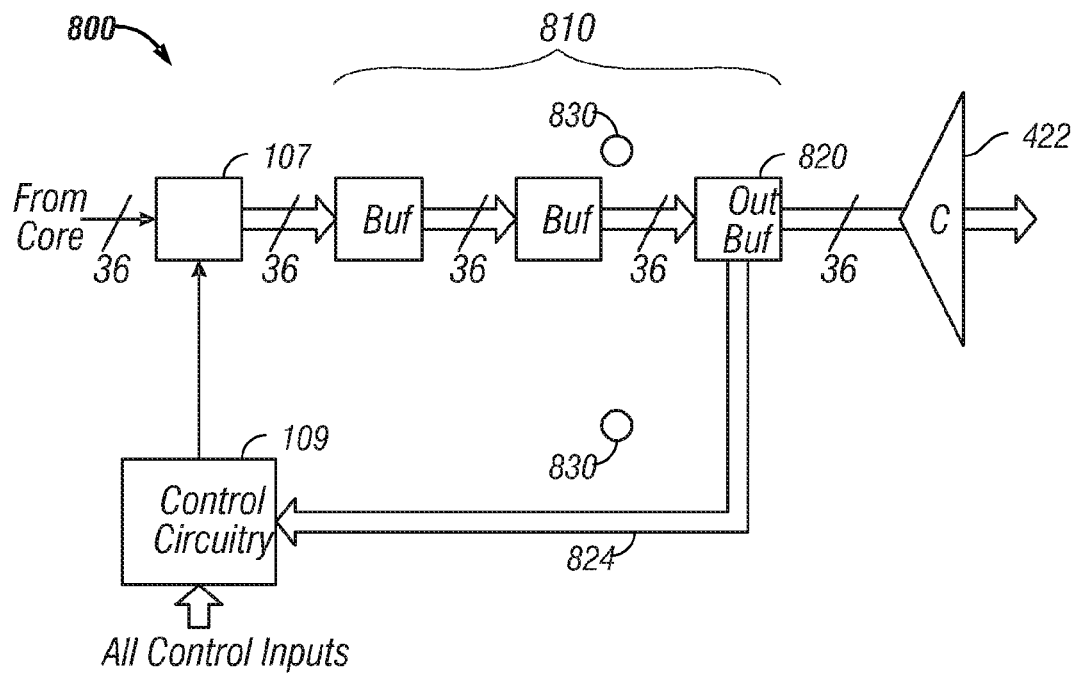
FIG. 8 is a block diagram of output feedback circuitry with serial buffers according to various embodiments of the invention.

FIG. 8 is a block diagram of output feedback circuitry 800 with serial buffers 810 according to various embodiments of the invention. This circuitry 800 provides an alternative implementation of the feedback mechanism shown in FIG. 7. In this case, several asynchronous buffers 810 (e.g., first-in, first-out (FIFO) elements) are added to the output of the synchronous-to-asynchronous conversion circuitry 107. The output alignment and asynchronous feedback channel for the control circuitry 109 have been moved to the last buffer 820 in the chain of buffers 810. Output alignment can again be implemented using a conventional completion element, this time having 37 inputs that complete asynchronous enables for all 36 output data channels and for the control token on the feedback path. The output of the completion element 422 fans out (as an output enable signal) to all 36 outputs of the buffer 820. When all output channels are ready to receive data, and a data token from any one of the 36 output bits leaves the buffer 820, the output buffer 820 sends a control token back to the control circuitry 109. When the control circuitry 109 receives the feedback token and all control tokens, it produces the clock signal 156 for the synchronous-to-asynchronous conversion circuitry 107 to sample output data provided by the core circuit 105.

Not having to check all 36 outputs before generating a control token for the feedback path (as shown in FIG. 8) often allows the BRAM implementation to operate at a higher peak frequency than the implementation shown in FIG. 7. This is because the performance of the BRAM implementation described is sometimes limited by the latency around the loop from the control circuitry 109 generating a clock pulse, to the synchronous-to-asynchronous conversion circuitry 107 sampling the core circuit 105 outputs, to the output tokens that exit the BRAM via buffers 810, and the resulting control token reaching the control circuitry 109 via the feedback path 824 (which provides flow control). However, because the BRAM has buffered outputs to store the results of two BRAM operations, extra tokens 830 can be added in the loop. These extra tokens allow overlapping multiple handshakes within the loop and can significantly reduce the cycle time. Even more tokens can be added to further increase speed, as long as the number of tokens in the loop is less than or equal to the number of available buffer stages (each buffer stage holding one token) between the synchronous-to-asynchronous conversion circuitry 107 and the output buffer 820.

The control circuitry 109 generates clock signals 152, 146, and 156 for the asynchronous-to-synchronous conversion circuitry 103, the core circuit 105, and the synchronous-to-asynchronous conversion circuitry 107, respectively. The control circuitry 109 can operate to generate these signals when at least some of the following conditions are met:

asynchronous-to-synchronous conversion circuitry 103 inputs are ready—when a control token (e.g., signal 140) has arrived from the input alignment circuitry 102 indicating that all of the BRAM input data has arrived.

synchronous-to-asynchronous conversion circuitry 107 outputs are ready—when a control token (e.g., signal 142) has arrived from the output alignment circuitry indicating that all BRAM outputs are ready to accept tokens.

the operation on another port is complete—when the BRAM is operating with two ports in related mode, for example, the control circuitry 109 may operate to wait for a control token from port 138 indicating the port 138 has finished an operation. When the two ports are operating in unrelated mode, the control circuitry 109 can ignore this type of input, decoupling the sequence of operations between ports.

the input on the control pattern pat is ready—the control pattern pat can be used when ports are operating in related mode, and the operation implemented on the ports of the apparatus 100 are to be ordered with respect to the completion of an operation on other port(s) corresponding to other apparatus (e.g., ports 136, 138). The control pattern pat can also be used as a reference signal, assuming it is the last arriving signal, to control clock generation by the control circuit 109.

Upon receiving some or all the input control tokens listed above, the control circuitry 109 can operate to generate the clock signals 146, 152, 156. For example, if the BRAM is operating in related mode, the control circuit 109 may operate to send an operation completion token to the other port(s) 136, 138 of other apparatus. Afterward, the control circuitry 109 may operate to complete asynchronous handshakes on all asynchronous data channels, and wait for the next cycle.

Figure 9:
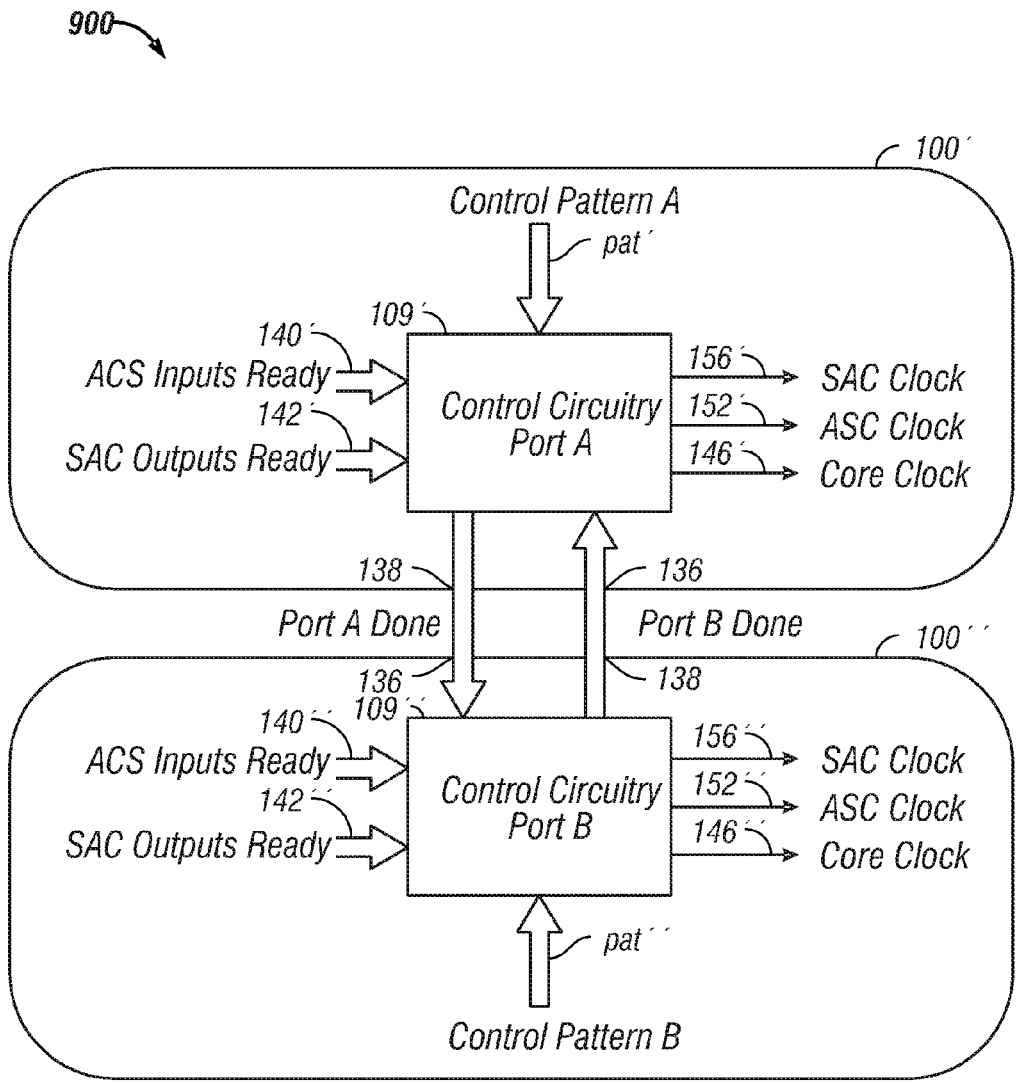
FIG. 9 is a block diagram of port coordination circuitry according to various embodiments of the invention.

FIG. 9 is a block diagram of port coordination circuitry 900 according to various embodiments of the invention. When the BRAM implementation described herein is operating in related mode, the operations of multiple apparatus 100', 100" having control of different ports of the BRAM are coordinated with each other. To accomplish coordination, control patterns pat' and pat", as well as coordination signals provided by ports 136 and 138 are used. In this way, control circuitry 109' in a first apparatus 100' can communicate with control circuitry 109" in a second apparatus 100". In this case, asynchronous data channels are depicted with wide arrows and generated clock signals are shown as narrow arrows.

Whenever a port A or B finishes a BRAM operation (e.g., clock pulses are issued), the finished port sends a token to the other port's control circuitry via the channels Port A Done or Port B Done, as appropriate. Thus, each port is informed in a timely manner as to when the other port has completed its operation.

Each port then uses the external control pattern input (e.g., pat' or pat") to modify clock generation for subsequent operations. Depending on the value of this input, optionally combined with the static configuration of the port, the control circuitry 109 can operate to choose several actions.

As a first option, once the input arrives on port 138, the control circuitry 109 can generate the next set of clock pulses 146, 152, 156, completing the handshakes port 138 and the control pattern pat. As a second option, once the input arrives on port 138, the control circuitry 109 can skip the next cycle of clock pulse generation, completing the handshakes port 138 and the control pattern pat. As a third option, the control circuitry 109 can insert an extra cycle of clock pulses, completing only the handshake for the control pattern pat, and ignore any input on port 138 (to be left pending for the next cycle).

The first option causes an operation on a first port to issue in lock-step with operations on a second port, so that each completed operation on the second port allows the first port to issue an operation. The second option can be used to allow the first port to issue operations at a slower rate than the second port, so that multiple operations on the second port can be allowed to proceed without waiting for corresponding operations on the first port. The third option can be used to allow the first port to issue operations at a faster rate than the second port, so that multiple operations on the first port will be generated before synchronizing with an operation on the second port.

Using the mechanism shown in FIG. 9, some or all of the options can be combined using a pre-determined control pattern to implement arbitrary sequencing of operations among ports. For example, in order to allow two operations on port A for each operation on port B, port A can be sent the first option, followed by a repeating set of options three and one. Port B can be sent the first option, followed by a repeating set of options two and one. For additional flexibility, the control pattern pat can be modified dynamically, to change the sequencing of operations among the ports, instead of using a fixed control pattern that keeps the sequencing relationship constant.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

Referring now to FIGS. 1-9, it can be seen that an apparatus 100 may comprise a synchronous circuit 105 coupled to at least one synchronous input data path 104 and at least one synchronous output data path 106. The apparatus 100 may further comprise asynchronous-to-synchronous conversion circuitry 103 coupled to the at least one synchronous input data path 104 and to asynchronous input alignment circuitry 102 that is in turn coupled to at least one asynchronous port 132 included in the apparatus 100. The apparatus 100 may also comprise synchronous-to-asynchronous conversion circuitry 107 coupled to the at least one synchronous output data path 106, wherein at least one of a number of data inputs 160 corresponding to data 120 supplied to the asynchronous input alignment circuitry 102 or a number of data outputs (e.g., tokens 148) from the synchronous-to-asynchronous conversion circuitry 107 are progammably reconfigurable. As noted previously, the synchronous circuit 105 may comprise a memory array, as well as other synchronous circuits, including a processor, a multiplier, and/or a set of synchronous logic, such as a register, among others.

The data inputs 160 can form part of an asynchronous data path 101. Thus, the apparatus 100 may comprise an asynchronous data path 101 coupled to the asynchronous input alignment circuitry 102, the asynchronous data path 101 comprising data inputs 160.

The data outputs (e.g., tokens 148) can form part of an asynchronous data path 108. Thus, the apparatus 100 may comprise an asynchronous data path 108 coupled to the synchronous-to-asynchronous conversion circuitry 107, the asynchronous data path 108 comprising the data outputs (e.g., tokens 148).

Control circuitry 109 may be used to coordinate alignment of asynchronous tokens. Thus, the apparatus 100 may further comprise control circuitry 109 coupled to receive input alignment information (e.g., signal 140) from the asynchronous input alignment circuitry 102, and output alignment information (e.g., signal 142) from the synchronous-to-asynchronous conversion circuitry 107.

The control circuitry 109 may be used to coordinate multi-port activity. As those of ordinary skill in the art will appreciate after reading this disclosure, this functionality can be useful when the synchronous device making up the synchronous circuit 105 has inputs and/or outputs operating in more than one clock domain, so that individual ports can be dedicated to individual clock domains. Thus, the apparatus 100 may comprise control circuitry 109 to transmit control patterns pat to multiple ports to communicate a status associated with an asynchronous operation (e.g., an asynchronous memory operation) that enables synchronizing activities between the multiple ports.

Further embodiments may be constructed, based on the use of a memory array within the synchronous core circuit 105. For example, when the synchronous core circuit 105 comprises a memory array, a variety of memory width/depth combinations can be supported. This can occur when the apparatus 100 comprises emulation logic to support asynchronous memory width and memory depth access combinations that are not native to the synchronous memory array. Thus, the emulation logic may comprise a copy circuit and a routing circuit (e.g., included in width/depth reconfiguration circuitry 300). In this way, copy and routing circuits can be used to convert non-native memory width/depth combinations to native memory width/depth combinations.

Buffers may be used to align incoming asynchronous data prior to permitting the data to enter a synchronous domain. Thus, the asynchronous input alignment circuitry 102 may comprise asynchronous buffers 410 coupled to a completion tree 418.

The alignment circuit 400 can be used to signal when the tokens to be used in a particular operation have arrived. Thus, the asynchronous-to-synchronous conversion circuitry 103 may operate to receive a completion signal 428 from the asynchronous input alignment circuitry 102 (e.g., clock signal 152, via the control circuit 109) and to responsively generate a clock signal to be supplied to the synchronous circuit 105 (e.g., the clock signal 146, via the control circuit 109).

When the synchronous circuit 105 comprises a memory array, a multiplexer and storage circuit can be used to support multiple read modes. Thus, in some embodiments, the apparatus 100 comprises at least one multiplexer 510 coupled between the synchronous output data path 106 and the synchronous-to-asynchronous conversion circuitry 107, and a storage circuit 518 coupled to the multiplexer 510, the storage circuit 518 to store a last value of data provided on the synchronous output data path 106 by the synchronous circuit 105 comprising a memory array.

Synchronous data can be clocked into conversion circuitry, where handshaking operates to create asynchronous output tokens. Thus, the synchronous-to-asynchronous conversion circuitry 107 can operate to receive a synchronous sampling clock signal 156 from control circuitry 109 coupled to the synchronous circuit 105, and to responsively convert synchronous data appearing on the synchronous output data path 106 to asynchronous data (e.g., tokens 148) via handshaking operations. Other embodiments may be realized.

For example, an FPGA may be combined with one or more of the apparatus 100 to create multi-port variations of the apparatus 200. Thus, an apparatus 200 may comprise an FPGA having asynchronous inputs and outputs, and one or more asynchronous circuits 105 coupled to the asynchronous inputs and outputs as described previously.

When the synchronous circuit 105 comprises a memory array, still further embodiments may be realized. For example, a read clock signal can be used to sample the synchronous data path, subject to feedback. Thus, the apparatus 200 may comprise control circuitry 109 to provide a read clock signal 156 to the synchronous-to-asynchronous conversion circuitry 107 responsive to receiving a feedback signal 142 indicating that an asynchronous data path 108 coupled to the synchronous-to-asynchronous conversion circuitry 107 is ready to accept tokens 148 to be supplied to the number of outputs.

An asynchronous control channel and output alignment circuitry can be used to provide the feedback. Thus, the apparatus 200 may comprise output alignment circuitry (e.g., one or more completion elements 422) coupled to control circuitry 109 and the synchronous-to-asynchronous conversion circuitry 107 to provide a feedback signal indicating that an asynchronous data path 108 coupled to the synchronous-to-asynchronous conversion circuitry 107 is ready to accept tokens 148 to be supplied to the outputs.

Buffers, such as FIFO buffers, can be used to regulate the operational speed of the multi-token loop formed by the synchronous-to-asynchronous conversion circuitry 107, the buffer 820, and the control circuitry 109. Thus, the apparatus 200 may comprise multiple asynchronous buffers 810 coupled in series to the synchronous-to-asynchronous conversion circuitry 107 to provide a feedback signal indicating that an asynchronous data path 108 coupled to the synchronous-to-asynchronous conversion circuitry 107 is ready to accept tokens to be supplied to the outputs.

When the synchronous circuit 105 comprises a memory array, multiple read or write modes can be provided by the resulting asynchronous memory apparatus 100. Thus, an apparatus may include an output data path that is configured to support both write-first and no-change write modes, among others.

The control circuitry 109 can be used to coordinate operations between multiple asynchronous memory ports in some embodiments. Thus, an apparatus 200, for example, may comprise control circuitry 109 to provide an indication to some of the multiple asynchronous ports as to when operations at individual ones of the multiple asynchronous ports have been completed (e.g., see FIG. 9).

Ports can use a number of mechanisms to coordinate operations, including slower, faster, and lock-step operation. In this way, memory operations (and other logic processing operations) can be coordinated. Thus, when an apparatus 200 comprises multiple asynchronous ports, some of the multiple asynchronous ports can be configured to receive a control pattern input to modify clock generation for subsequent asynchronous memory operations that are to occur after the current asynchronous memory operation.

The control circuitry 109 can be used as a source of multiple clock signals. Thus, an apparatus 100 can use the control circuitry 109 to generate clock signals to be transmitted to the synchronous circuit 105, the asynchronous-to-synchronous conversion circuitry 103, and the synchronous-to-asynchronous conversion circuitry 107. Still further embodiments may be realized as methods.

Figure 10:
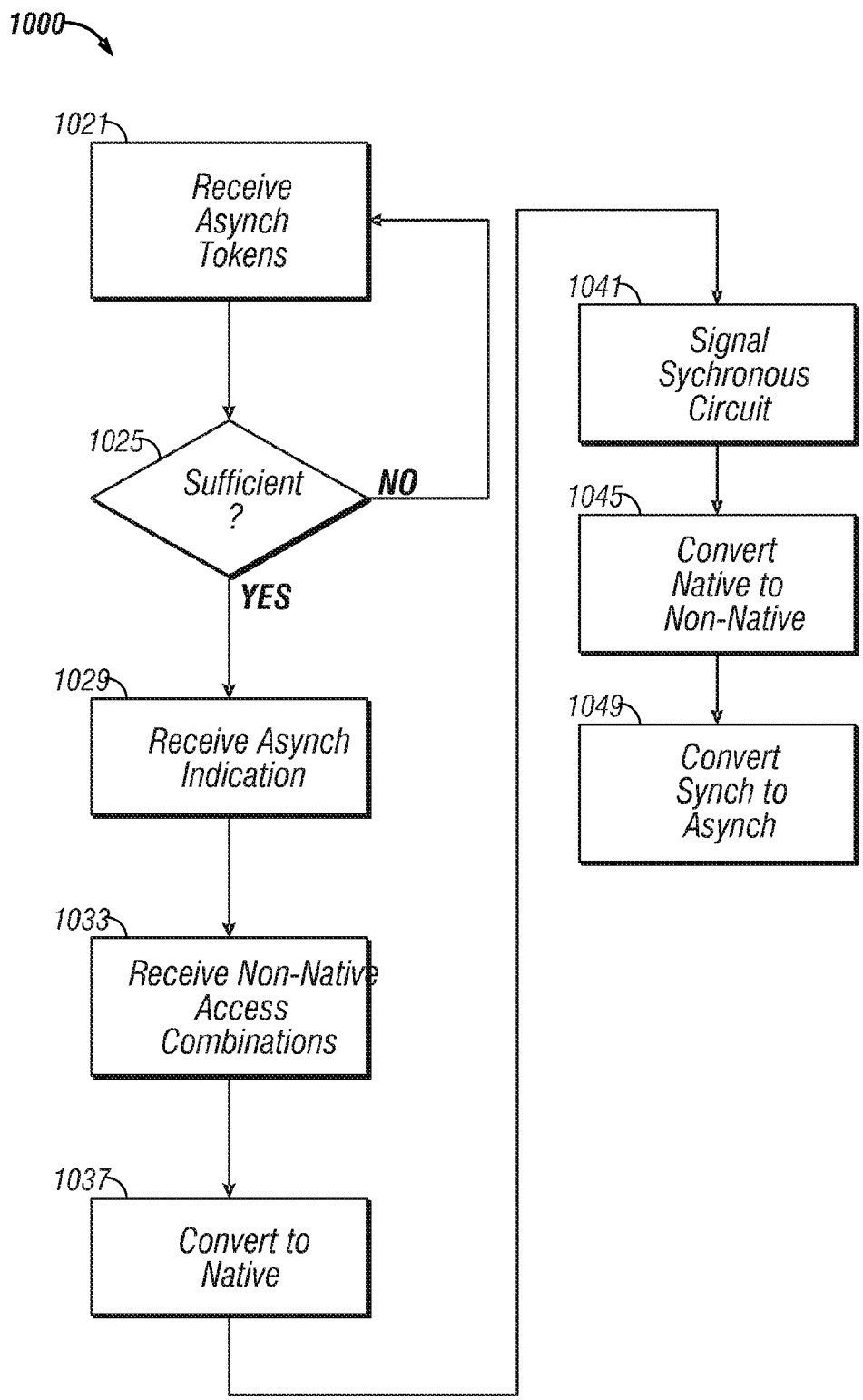
FIG. 10 is a flow diagram illustrating various methods according to various embodiments of the invention.

For example, FIG. 10 is a flow diagram illustrating various methods 1000 according to various embodiments of the invention. In some embodiments, the method 1000 includes waiting to receive sufficient asynchronous tokens to implement a specified processing operation, and when sufficient tokens are received at asynchronous inputs (and the asynchronous outputs of an apparatus are ready for the specified operation), the operation may commence within the synchronous circuit. The output from the specified operation is then converted to asynchronous form and provided to the asynchronous outputs.

Thus, a processor-implemented method 1000 to execute on one or more processors that perform the method, may begin at block 1021 with receiving a sufficient number of asynchronous input tokens at the inputs of an asynchronous apparatus to conduct a specified processing operation, with some of the tokens being decoded to determine an operation type associated with the specified processing operation. For example, if a synchronous circuit operating according to the method 1000 comprises a memory array, then the specified operation may comprise a write operation, and the operation type may comprise a write-first operation type, or a no-change operation type, among others.

Thus, the method 1000 may include, at block 1025, determining whether sufficient tokens have arrived for processing. In some embodiments, a completion tree, coupled to multiple asynchronous buffers, can be used to indicate when sufficient asynchronous tokens have been received, and are ready for processing. Thus, the activity at block 1025 may comprise determining that a sufficient number of asynchronous input tokens have been received by monitoring the output of a completion tree coupled to asynchronous buffers.

In some embodiments, all of the asynchronous input tokens are needed before the specified operation may be undertaken. Thus, the activity at block 1025 may comprise determining that the sufficient number of asynchronous input tokens comprises all of the asynchronous input tokens that are available. The method 1000 may continue on to block 1029 with receiving an indication that outputs of the asynchronous apparatus are ready to conduct the specified processing operation.

In some embodiments, the synchronous circuit comprises a memory array. If this is the case, the asynchronous implementation can accommodate combinations of memory width and depth that differ from what is native to the synchronous memory core. Thus, the method 1000 may include, at block 1033, receiving a plurality of asynchronous memory width and memory depth access combinations that are not native to the synchronous memory array.

The method 1000 may go on to include converting the access combinations into a native access combination at block 1037. One way to handle an asynchronous input data path that has a width and depth different from the native capability of the synchronous memory is to add address bits, and reduce the data bus width, as discussed above. Thus, the activity at block 1037 may comprise extending the number of native address bits by a number of additional address bits, and converting the additional address bits into high-order data bits, reducing the native memory data bus width.

The method 1000 may go on to block 1041 to include signaling a synchronous circuit to process data included in the tokens according to the specified processing operation.

When the synchronous circuit comprises a memory array, output data provided by the synchronous memory array in native format can be converted to a non-native width/depth format. Thus, the method 1000 may further comprise, at block 1045, converting a native access combination of memory width and memory depth associated with the synchronous memory array to one of a number of non-native access combinations. One way to convert data in a native synchronous format to a non-native asynchronous format is to route the data. Thus, the activity at block 1045 may comprise routing portions of native width synchronous memory array output data to provide an asynchronous data bus with a width that is less than the native width.

The method 1000 may go on to include, at block 1049, converting synchronous outputs from the synchronous circuit into asynchronous output tokens to be provided to outputs of the asynchronous apparatus when the synchronous outputs result from the specified processing operation. When the synchronous circuit comprises a memory array, the specified operation may comprise any one or more of several different memory operations, such as reading, writing, and erasing data. Thus, the specified processing operation may comprise one of a memory read operation or a memory write operation.

The methods described herein do not have to be executed in the order described, or in any particular order. Moreover, various activities described with respect to the methods identified herein can be executed in repetitive, serial, or parallel fashion. The individual activities of the methods shown in FIG. 10 can also be combined with each other and/or substituted, one for another, in various ways other that what is shown in the figure. Information, including parameters, commands, operands, and other data, can be sent and received in the form of one or more carrier waves. Thus, many other embodiments may be realized.

The methods shown in FIG. 10 can be implemented in various devices as part of a system, as well as in a computer-readable storage medium, where the methods can be executed by one or more processors. Further details of such embodiments will now be described.

Figure 11:
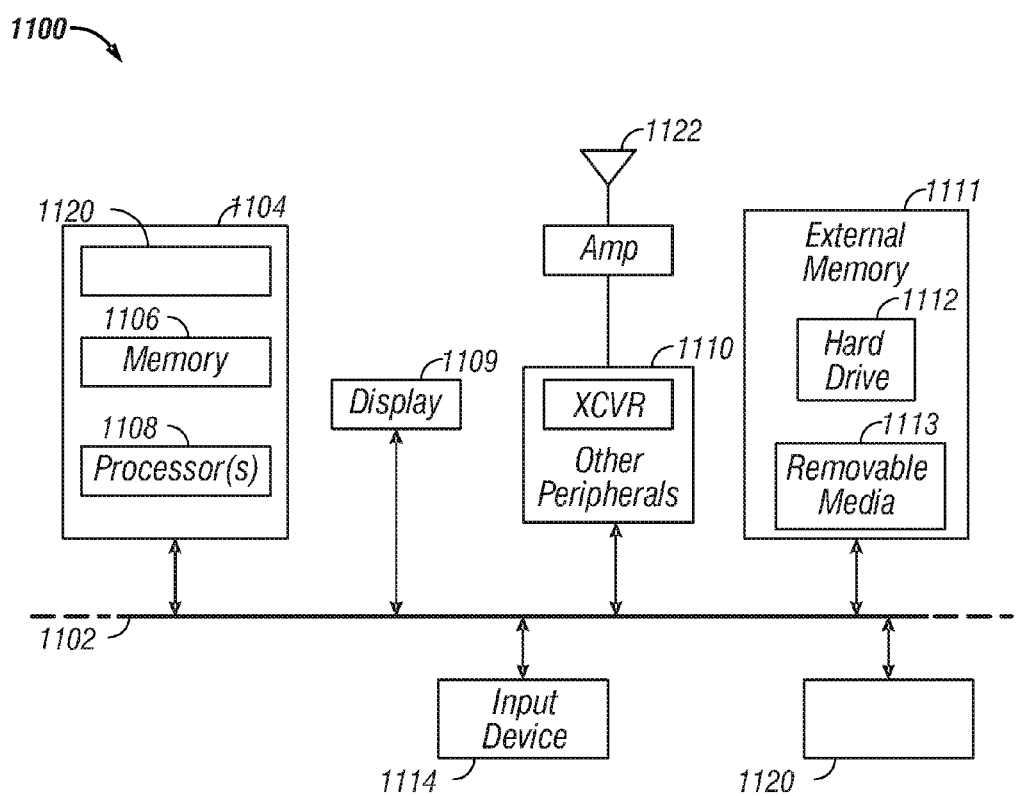
FIG. 11 is a block diagram of a system according to various embodiments of the invention.

FIG. 11 is a block diagram of a system 1100 according to various embodiments of the invention. Examples of such systems 1100 include, but are not limited to televisions, cellular telephones, personal data assistants (PDAs), personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

In this example, system 1100 comprises a data processing system that includes a system bus 602 to couple the various components of the system 1100. System bus 1102 provides communications links among the various components of the system 1100 and may be implemented as a single bus, as a combination of busses, or in any other suitable manner.

Chip assembly 1104, which may include one or more apparatus 1120 (similar to or identical to apparatus 100, 200 of FIGS. 1, 2, respectively), is coupled to the system bus 1102. Chip assembly 1104 may include any circuit or compatible combination of circuits. In one embodiment, chip assembly 1104 includes a processor 1108 or multiple processors that can be of any type. As used herein, "processor" means any type of computational circuit such as, but not limited to, a microprocessor, a microcontroller, a graphics processor, a digital signal processor (DSP), or any other type of processor or processing circuit. As used herein, "processor" includes multiple processors or multiple processor cores. One or more apparatus 1120 may be coupled directly to the system bus 1102.

In one embodiment, a memory device 1106 is included in the chip assembly 1104. Those of ordinary skill in the art will recognize that a wide variety of memory device configurations may be used in the chip assembly 1104. Memory 1106 can also include non-volatile memory types, such as flash memory.

System 1100 may also include an external memory 1111, which in turn can include one or more memory elements suitable to the particular application, such as one or more hard drives 1112, and/or one or more drives that handle removable media 1113 such as flash memory drives, compact disks (CDs), digital video disks (DVDs), and the like.

System 1100 may also include a display device 1109 such as a monitor, additional peripheral components 1110, such as speakers, etc. and a user input device 1114, such as a keyboard, keypad, and/or controller, which can include a mouse, trackball, game controller, voice-recognition device, or any other device that permits a system user to input information into and receive information from the system 1100. Thus, additional embodiments may be realized.

For example, the additional peripheral components 1110 may comprise a wireless transceiver XCVR, perhaps coupled to a cellular telephone transmission signal power amplifier AMP and an antenna 1122. Thus, a system 1100 may comprise a wireless transceiver XCVR to receive and transmit data, and an asynchronous circuit in the form of an apparatus 1120 to process the data. The data may be carried by the system bus 1102. The system 1100 may further comprise a display 1109 to display at least a portion of the data and/or at least one user input device 1114 comprising a touch screen or a keypad, for example. Still further embodiments may be realized.

For example, the system 1100 may comprise an article of manufacture, including a specific machine, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture, such as a computer, a memory system, a magnetic or optical disk, some other storage device, and/or any type of electronic device or system may include one or more processors 1108 coupled to a machine-readable medium such as a memory 1106 or 1111 (e.g., removable storage media, as well as any memory including an electrical, optical, or electromagnetic conductor) having instructions stored thereon (e.g., computer program instructions), which when executed by the one or more processors 1108 result in the machine performing any of the actions described with respect to the methods above. The chip assembly 1104 may itself comprise an apparatus 1120.

Implementing the apparatus, systems, and methods described herein may operate to provide an asynchronous implementation of a more readily available synchronous circuit design, such as implementing single or multi-port high-performance flexible asynchronous programmable memories using synchronous memory blocks. This combination may provide enhanced performance and/or reduced operational power over a purely synchronous design.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-implemented method to execute on one or more processors that perform the method, comprising:
   receiving a sufficient number of asynchronous input tokens at the inputs of an asynchronous apparatus to conduct a specified processing operation, some of the tokens decoded to determine an operation type associated with the specified processing operation;
   receiving an indication that outputs of the asynchronous apparatus are ready to conduct the specified processing operation;
   signaling a synchronous circuit to process data included in the tokens according to the specified processing operation; and
   converting synchronous outputs from the synchronous circuit into asynchronous output tokens to be provided to outputs of the asynchronous apparatus when the synchronous outputs result from the specified processing operation.

2. The method of claim 1, further comprising:
   receiving a plurality of asynchronous memory width and memory depth access combinations that are not native to the synchronous memory array; and
   converting the access combinations into a native access combination.

3. The method of claim 2, wherein converting the access combinations comprises:
   extending a number of native address bits by a number of additional address bits; and
   converting the additional address bits into high-order data bits, reducing a native memory data bus width.

4. The method of claim 1, further comprising:
   converting a native access combination of memory width and memory depth associated with the synchronous memory array to one of a pre-selected number of non-native access combinations.

5. The method of claim 4, wherein converting the native access combinations comprises:
   routing portions of native width synchronous memory array output data to provide an asynchronous data bus with a width that is less than the native width.

6. The method of claim 1, further comprising:
   determining that the sufficient number of asynchronous input tokens have been received by monitoring the output of a completion tree coupled to asynchronous buffers.

7. The method of claim 1, wherein the asynchronous circuit comprises a memory, and wherein the specified processing operation comprises one of a memory read operation or a memory write operation.

8. The method of claim 1, wherein the sufficient number of asynchronous input tokens comprises all of the asynchronous input tokens.

9. A field-programmable gate array, comprising:
   a synchronous memory coupled to at least one synchronous input data path and at least one synchronous output data path;
   asynchronous-to-synchronous conversion circuitry coupled to the at least one synchronous input data path and to asynchronous input alignment circuitry that is in turn coupled to at least one asynchronous input port of the array; and
   synchronous-to-asynchronous conversion circuitry coupled to the at least one synchronous output data path and to one or more outputs of the array, wherein at least one of a number of data inputs to the asynchronous input alignment circuitry or a number of the outputs of the array are programmably reconfigurable.

10. The array of claim 9, wherein the number of data inputs to the asynchronous input alignment circuitry, and the number of the outputs of the array are configurable to correspond to various combinations of width and depth arrangements of the memory.

11. The array of claim 9, configurable to support write-first or no-change output modes.

12. The array of claim 9, wherein the memory comprises a quasi-delay insensitive memory.

13. The array of claim 9, further comprising:
    control circuitry to synchronize the at least one asynchronous input port and at least one of the outputs of the array.

14. The array of claim 9, further comprising:
    logic to emulate multiple non-native access configurations of the memory.

15. The array of claim 9, further comprising:
    at least one routing block forming part of the asynchronous-to-synchronous conversion circuitry.

16. A system, comprising:
    a wireless transceiver to receive or transmit data; and
    an asynchronous circuit to process the data, the asynchronous circuit comprising a synchronous circuit coupled to at least one synchronous input data path and at least one synchronous output data path, asynchronous-to-synchronous conversion circuitry coupled to the at least one synchronous input data path and to asynchronous input alignment circuitry that is in turn coupled to at least one asynchronous port included in the asynchronous circuit, and synchronous-to-asynchronous conversion circuitry coupled to the at least one synchronous output data path, wherein at least one of a number of data inputs to the asynchronous input alignment circuitry or a number of data outputs from the synchronous-to-asynchronous conversion circuitry are programmably reconfigurable.

17. The system of claim 16, further comprising:
    a cellular telephone transmission signal power amplifier coupled to the wireless transceiver and an antenna.

18. The system of claim 16, further comprising:
    a display to display at least a portion of the data.

19. The system of claim 16, further comprising:
    at least one user input device to couple to a bus that is in turn coupled to the transceiver, the user input device comprising a touch screen or a keypad.

20. The system of claim 16, wherein the synchronous circuitry comprises a synchronous random access memory.

* * * * *

UNITED STATES PATENT AND TRADEMARK OFFICE
CERTIFICATE OF CORRECTION

| | | |
|---|---|---|
| PATENT NO. | : 8,078,899 B2 | |
| APPLICATION NO. | : 13/022843 | |
| DATED | : December 13, 2011 | |
| INVENTOR(S) | : Rajit Manohar et al. | |

It is certified that error appears in the above-identified patent and that said Letters Patent is hereby corrected as shown below:

On Sheet 2 of 9, Figure 2, line 1, delete "Mulitpliers" and insert -- Multipliers --, therefor.

On Sheet 2 of 9, Figure 2, line 5, delete "Mulitpliers" and insert -- Multipliers --, therefor.

On Sheet 8 of 9, Box No. 1041, Figure 10, line 2, delete "Sychronous" and insert -- Synchronous --, therefor.

In column 11, line 29, delete "progammably" and insert -- programmably --, therefor.

In column 14, line 63, delete "other that" and insert -- other than --, therefor.

Signed and Sealed this
Third Day of April, 2012

David J. Kappos
*Director of the United States Patent and Trademark Office*